US007021641B2

(12) United States Patent
Wu

(10) Patent No.: US 7,021,641 B2
(45) Date of Patent: Apr. 4, 2006

(54) SUSPENSION STRUCTURE FOR WHEELCHAIR

(75) Inventor: Donald P. H. Wu, Hsinchu County (TW)

(73) Assignee: PI Hsiang Machinery Mfg. Co., Hsinchu County (TW)

( * ) Notice: Subject to any disclaimer, the term of this patent is extended or adjusted under 35 U.S.C. 154(b) by 169 days.

(21) Appl. No.: 10/703,787

(22) Filed: Nov. 6, 2003

(65) Prior Publication Data

US 2005/0034903 A1 Feb. 17, 2005

(30) Foreign Application Priority Data

Aug. 13, 2003 (TW) .............................. 92214625 U

(51) Int. Cl.
*B62M 1/14* (2006.01)
*B60K 1/00* (2006.01)
*A47C 20/00* (2006.01)

(52) U.S. Cl. .............................. 280/250.1; 280/304.1; 280/DIG. 10; 180/65.1; 297/423.26; D12/131

(58) Field of Classification Search ............... 180/65.1, 180/907, 6.5, 6.48; 280/250.1, 642, 304.1, 280/42, DIG. 10; 297/423.26, DIG. 4; D12/131
See application file for complete search history.

(56) References Cited

U.S. PATENT DOCUMENTS 857,696 A * 6/1907 Weinstein .................. 280/5.28
1,226,848 A * 5/1917 Black ......................... 280/5.32
1,591,529 A * 7/1926 Guerber ...................... 280/47.4
3,666,292 A * 5/1972 Bartos ......................... 280/234
3,727,903 A * 4/1973 Brown ......................... 269/17
3,882,949 A * 5/1975 Anderson .................... 180/8.2
4,565,385 A * 1/1986 Morford .................. 280/304.1
5,233,743 A * 8/1993 Robertson et al. ......... 29/527.1
5,853,059 A * 12/1998 Goertzen et al. .......... 180/65.6
5,944,131 A * 8/1999 Schaffner et al. .......... 180/65.1
6,070,898 A * 6/2000 Dickie et al. ............ 280/304.1
6,131,679 A * 10/2000 Pulver et al. .............. 180/65.1
6,135,222 A * 10/2000 Furukawa .................. 180/65.5
6,199,647 B1 * 3/2001 Schaffner et al. .......... 180/65.1
6,460,641 B1 * 10/2002 Kral ........................ 180/24.02
6,554,086 B1 * 4/2003 Goertzen et al. .......... 180/65.1
6,776,430 B1 * 8/2004 White et al. ............. 280/304.1
6,845,996 B1 * 1/2005 Cheng ................. 280/124.179
2004/0004342 A1 * 1/2004 Mulhern et al. ......... 280/304.1

FOREIGN PATENT DOCUMENTS

EP 0384499 A1 * 8/1990
WO WO90/06097 * 6/1990
WO WO94/15567 * 7/1994

* cited by examiner

*Primary Examiner*—Christopher P. Ellis
*Assistant Examiner*—G B Klebe
(74) *Attorney, Agent, or Firm*—Charles E. Baxley

(57) ABSTRACT

A suspension structure for a wheelchair generally includes movable arm that serve to connect driving wheels with frame of a wheelchair, sliding unit is further provided for enabling the movable arm to movably connect with a front cantilever of the wheelchair. By such arrangements, in case that the wheelchair of the present invention encounters a raised ground, or similar barriers of the like, the front cantilever will work with the movable arm to raise front jockey wheels, whereas the driving wheels firmly catches the ground, such that enables the wheelchair to the pass the barrier smoothly without difficulties.

4 Claims, 9 Drawing Sheets

SUSPENSION STRUCTURE FOR WHEELCHAIR

BACKGROUND OF THE INVENTION

1. Field of the Invention

The present invention relates to a suspension structure for a wheelchair, and more particularly to a suspension structure comprised of front cantilever, movable arm and sliding assembly, which are provided between front jockey wheel, driving wheel and frame of a wheelchair.

2. Description of the Prior Arts

A conventional wheelchair with suspension structure as shown in FIGS. 1 and 2 (as disclosed by U.S. Pat. No. 6,199,647), wherein between a frame 10, driving wheel 11 and front jockey wheel 12 is provided with plural compression springs 13, the compression springs 13 serve to timely raise or lower down the front jockey wheel 12 and the driving wheel 11 upon encountering a raised ground, or similar barrier of the like, so as to enable the wheelchair to overcome the barrier. However, there are some deficiencies will be found in real operation:

First, the front jockey wheel 12 and the driving wheel 11 are independently structured, and which are adjusted by the compression springs 13 corresponds to road condition, in this case, upon encountering barrier, the body of the wheelchair will substantially tilt and swing sharply (caused by the compression and expansion of the compression springs), it is unsafe for user to sit on an unstable wheelchair. Moreover, the respective compression springs 13 also have elastic fatigue problem.

Second, when faced with a barrier and the front jockey wheel 12 is stopped by resistance (when the front jockey wheel abuts against slopping surface of the barrier), since the suspension structures of the front jockey wheel 12 and that of the driving wheel 11 are not interactively connected, the friction of the driving wheel with the road can not be increased correspondingly, in this case, the wheelchair is not easy to roll over the barrier.

Third, since the compression springs 13 serve as suspension structure for the driving wheel 11 and the front jockey wheel 12, the suspension structure is very complexly designed as comprising at least a pair of front cantilevers 14, a pair of drive rods 15, four pieces of compression spring 13 and shafts 16, a pair of stop rods 17. Thus the cost is pretty high.

The present invention has arisen to mitigate and/or obviate the afore-described disadvantages of the conventional suspension structure for a wheelchair.

SUMMARY OF THE INVENTION

The primary object of the present invention is to provide a suspension structure for wheelchair, which generally includes movable arm that serves to connect driving wheels with frame of a wheelchair, sliding unit is further provided for enabling the movable arm to movably connect with a front cantilever of the wheelchair. By such arrangements, upon encountering a raised ground, or similar barriers of the like, the front cantilever will work with the movable arm to raise the front jockey wheel, whereas the driving wheels firmly catches the ground, so as to enable the wheelchair to the pass the barrier smoothly without difficulties.

The present invention will become more obvious from the following description when taken in connection with the accompanying drawings, which shows, for purpose of illustrations only, the preferred embodiments in accordance with the present invention.

DETAILED DESCRIPTION OF THE PREFERRED EMBODIMENTS

Figure 1:
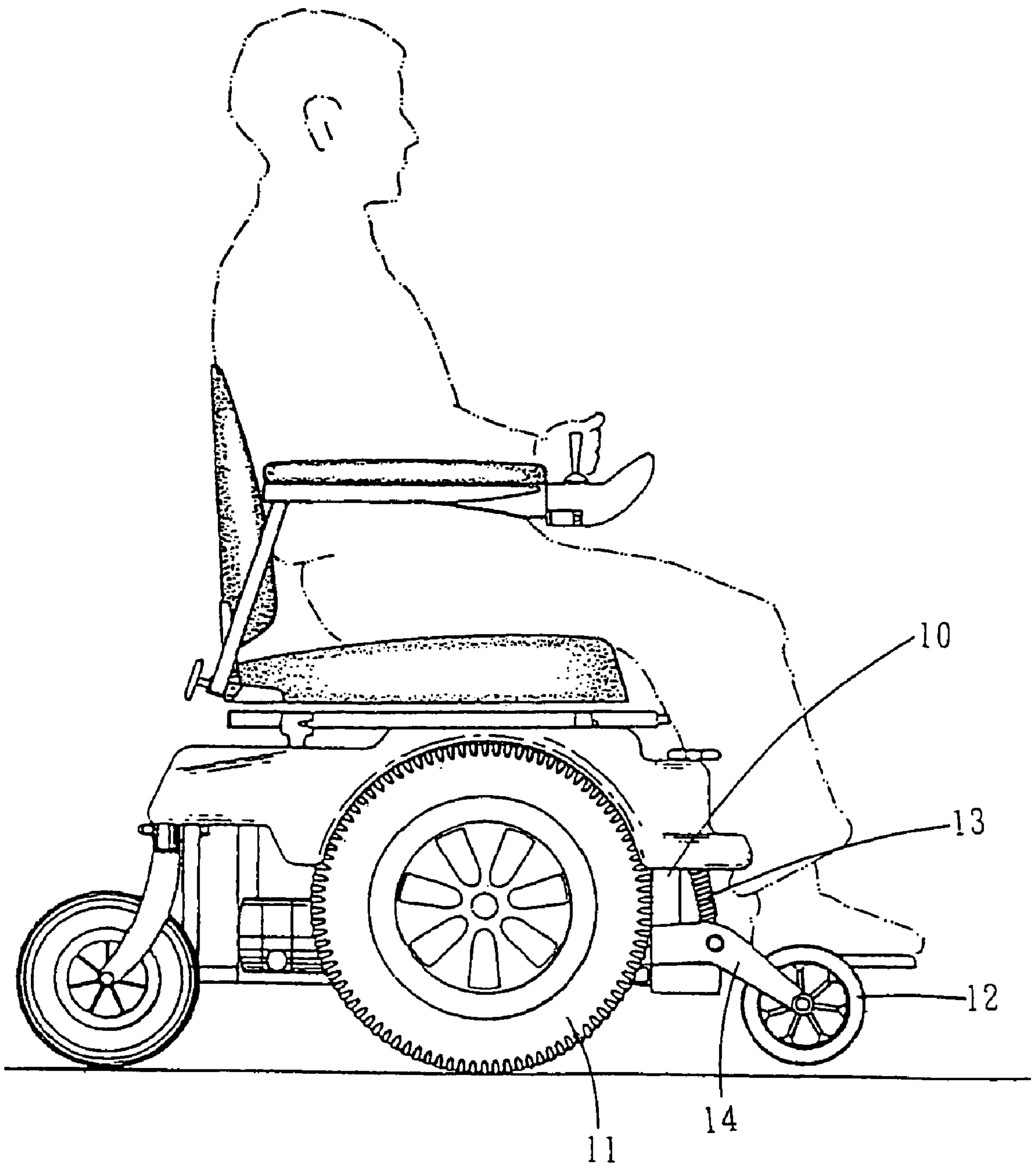
FIG. 1 PRIOR ART
FIG. 1 is an illustrative view of a wheelchair equipped with conventional suspension structure.
Figure 2:
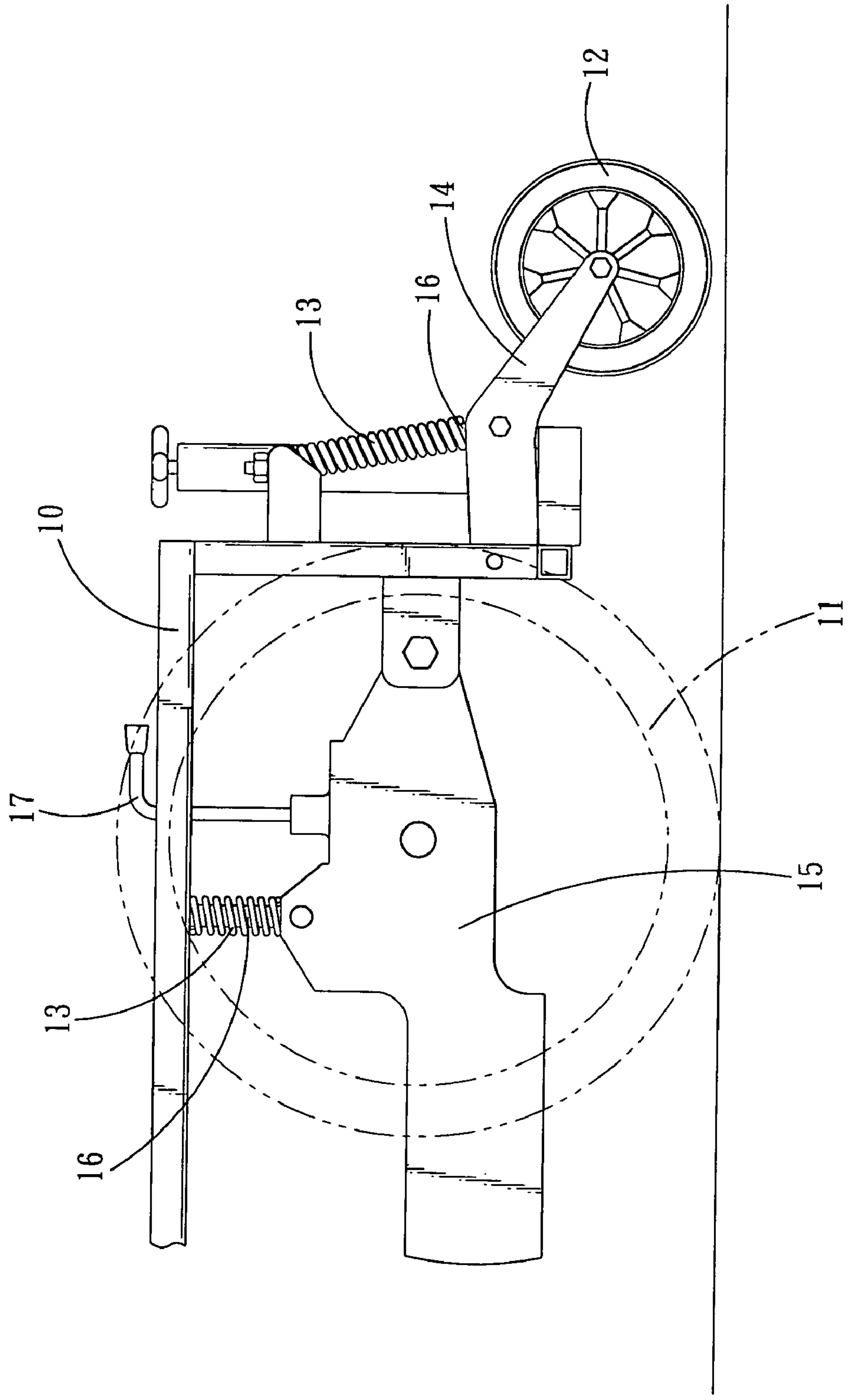
FIG. 2 PRIOR ART
FIG. 2 is a side view of the wheelchair equipped with conventional suspension structure.
Figure 3:
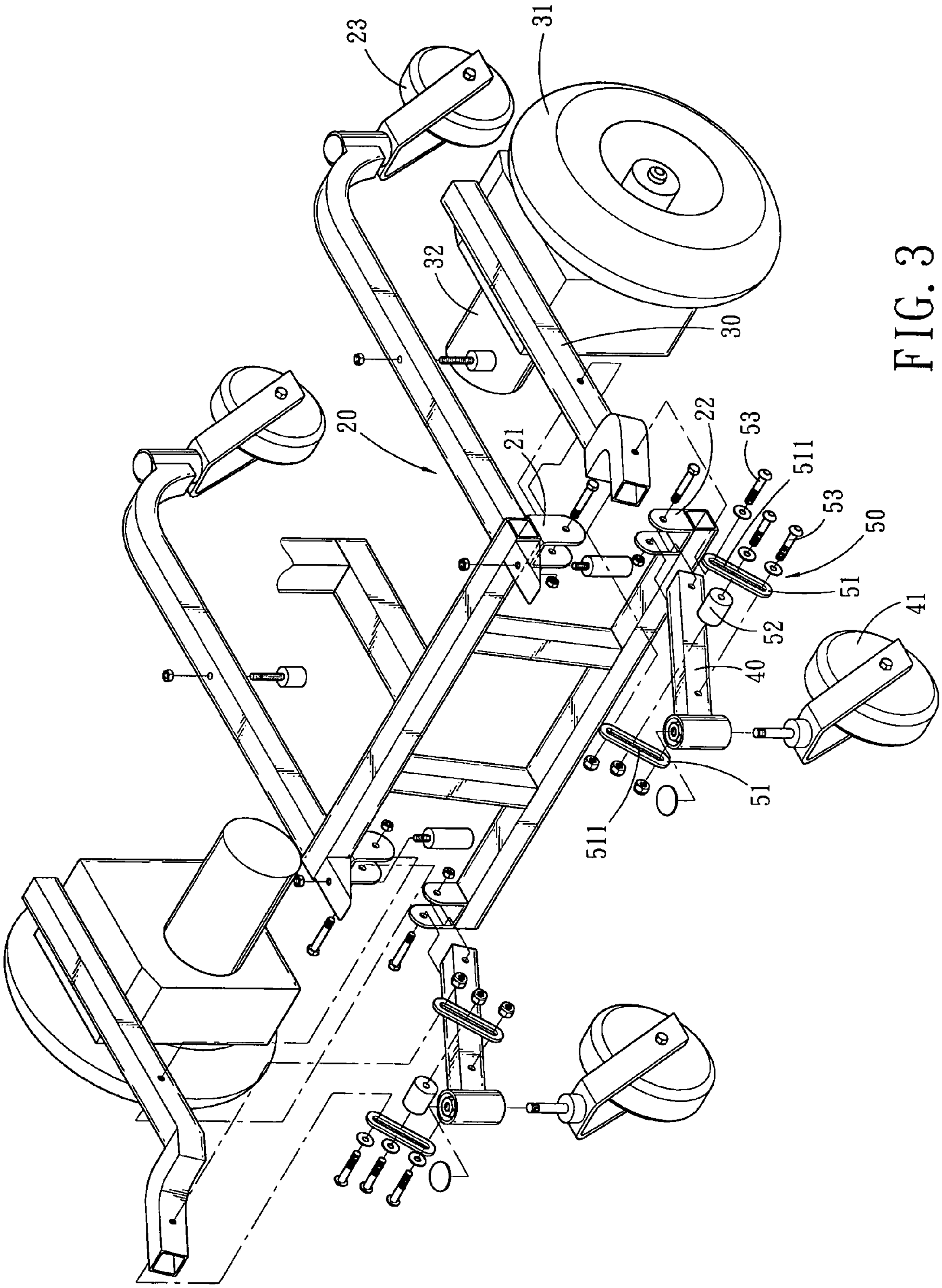
FIG. 3 is an exploded view of a suspension structure for wheelchair in accordance with the present invention.
Figure 4:
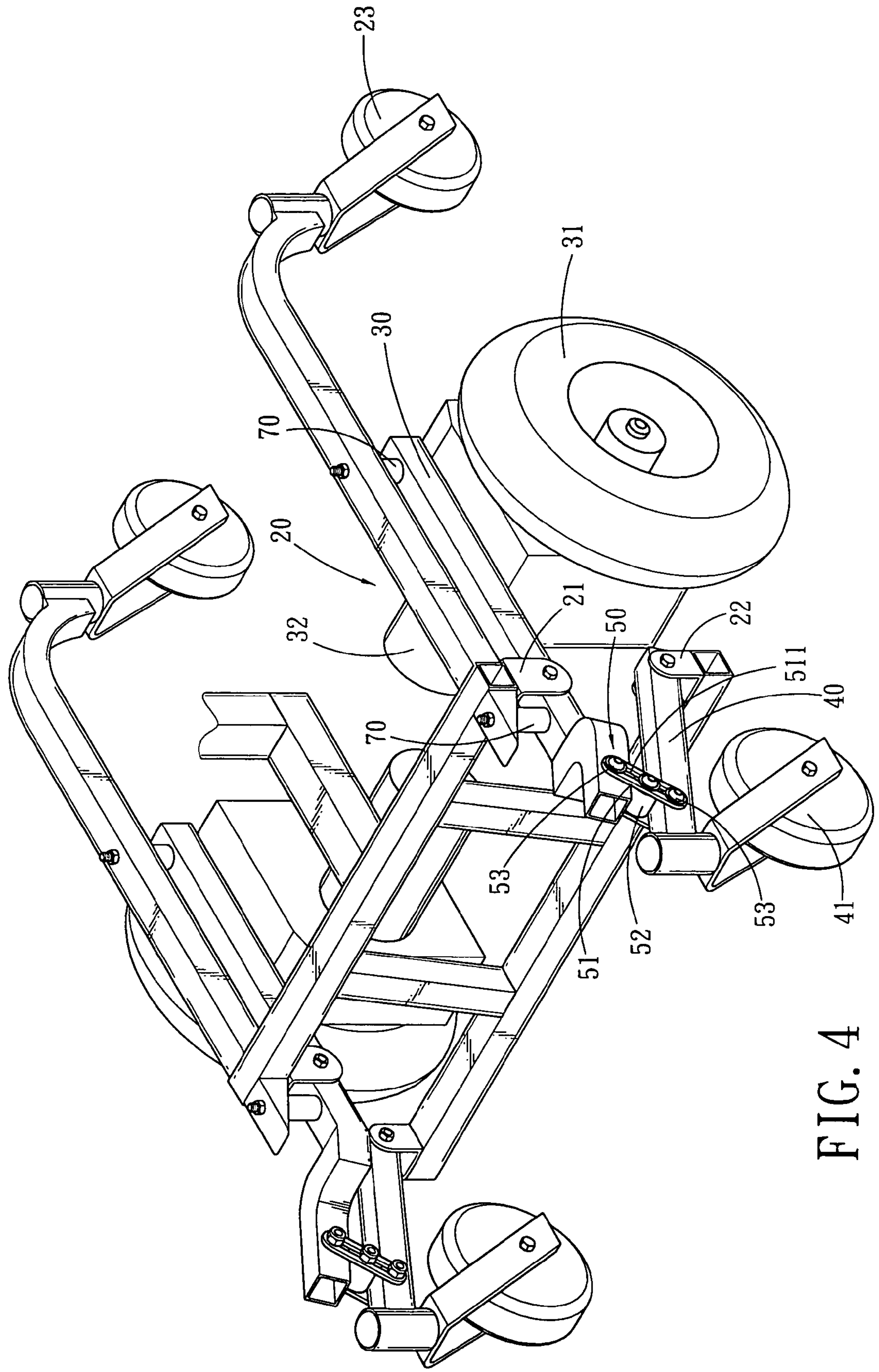
FIG. 4 is a perspective assembly view of a suspension structure for wheelchair in accordance with the present invention.
Figure 5:
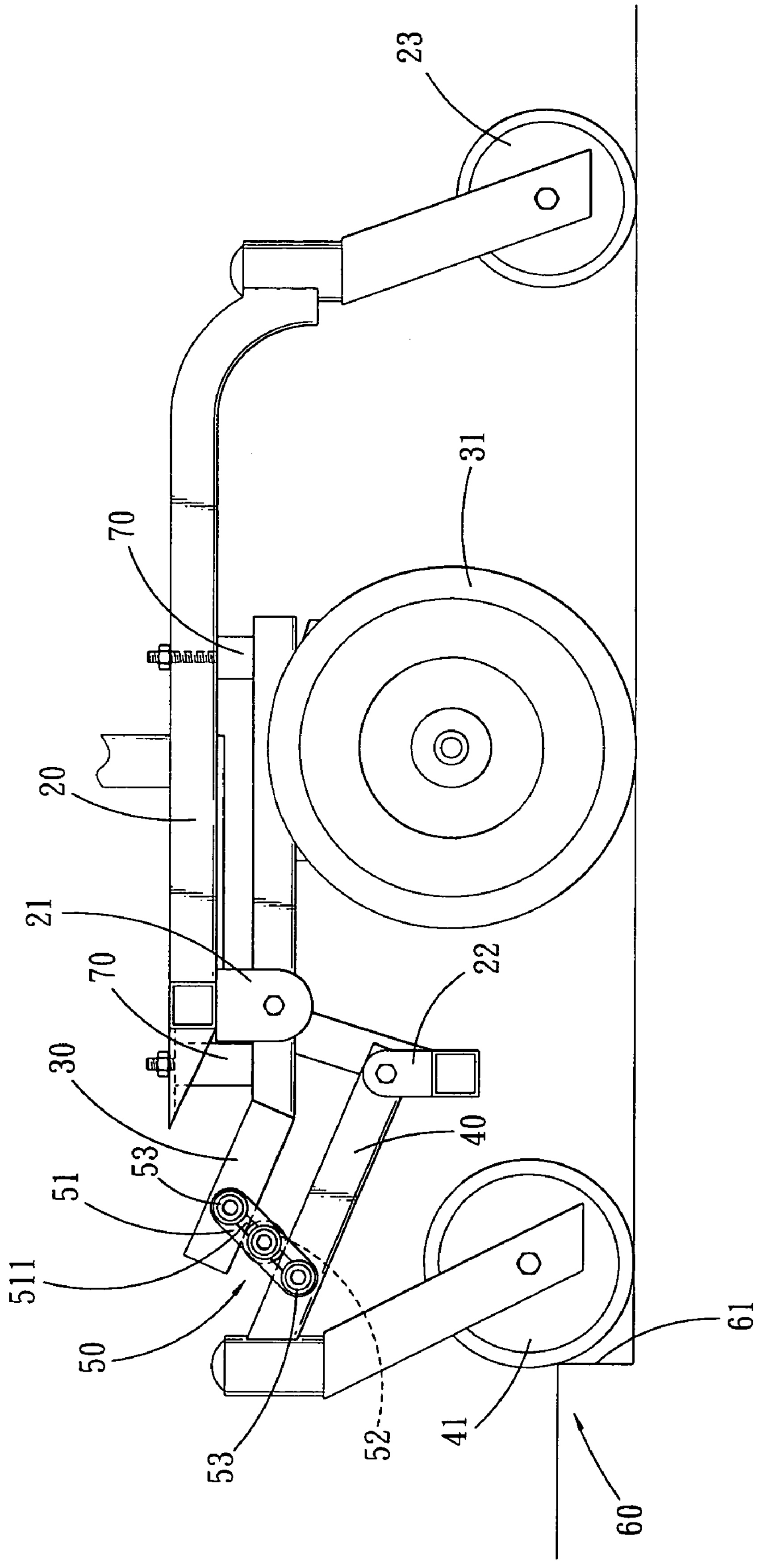
FIG. 5 is an operational view of the suspension structure for wheelchair in accordance with the present invention, wherein front jockey wheel rolls against a barrier.

Referring to FIGS. 3–5, wherein a suspension structure for wheelchair is shown and comprised of movable arm 30, front cantilever 40 and a sliding assembly 50 which are respectively provided between frame 20, driving wheel 31 and front jockey wheel 41.

The frame 20 is main body of a wheelchair and serves to carry respective components of the wheelchair. The front side of the frame can be provided with a first ear 21 and a second ear 22, the rear end of the frame can be equipped with rear wheel 23.

The movable arm 30 is swingingly coupled to the first ear 21 of the frame 20. An end of the movable arm 30 is connected to the driving wheel 31, the driving wheel 31 is driven by a motor 32 to move the wheelchair.

The front cantilever 40, a first end of which is equipped with the front jockey wheel 41 and a second of the front cantilever 40 is fixed to the second ear 22 of the frame, thus the front cantilever 40 is able to swing.

The sliding assembly 50 includes a pair of slide plates 51 and a shaft 52. Each of the slide plates 51 is defined with a slot 511, the slides plates 51 are oppositely arranged in corresponding way and then a pair of bolts 53 are used to make the movable arm 30 slidably connect to the front cantilever 40, and thus the bolts 52 are able to slide within the slot 511, the shaft 52 is slidably disposed between the two bolts 52.

Based on the above-mentioned structure, the wheelchair in accordance with the present invention is able to roll over barriers 60 easily and smoothly.

When running on level road, the front jockey wheel 41 and the driving wheel 31 keep contacting the ground.

Figure 6:
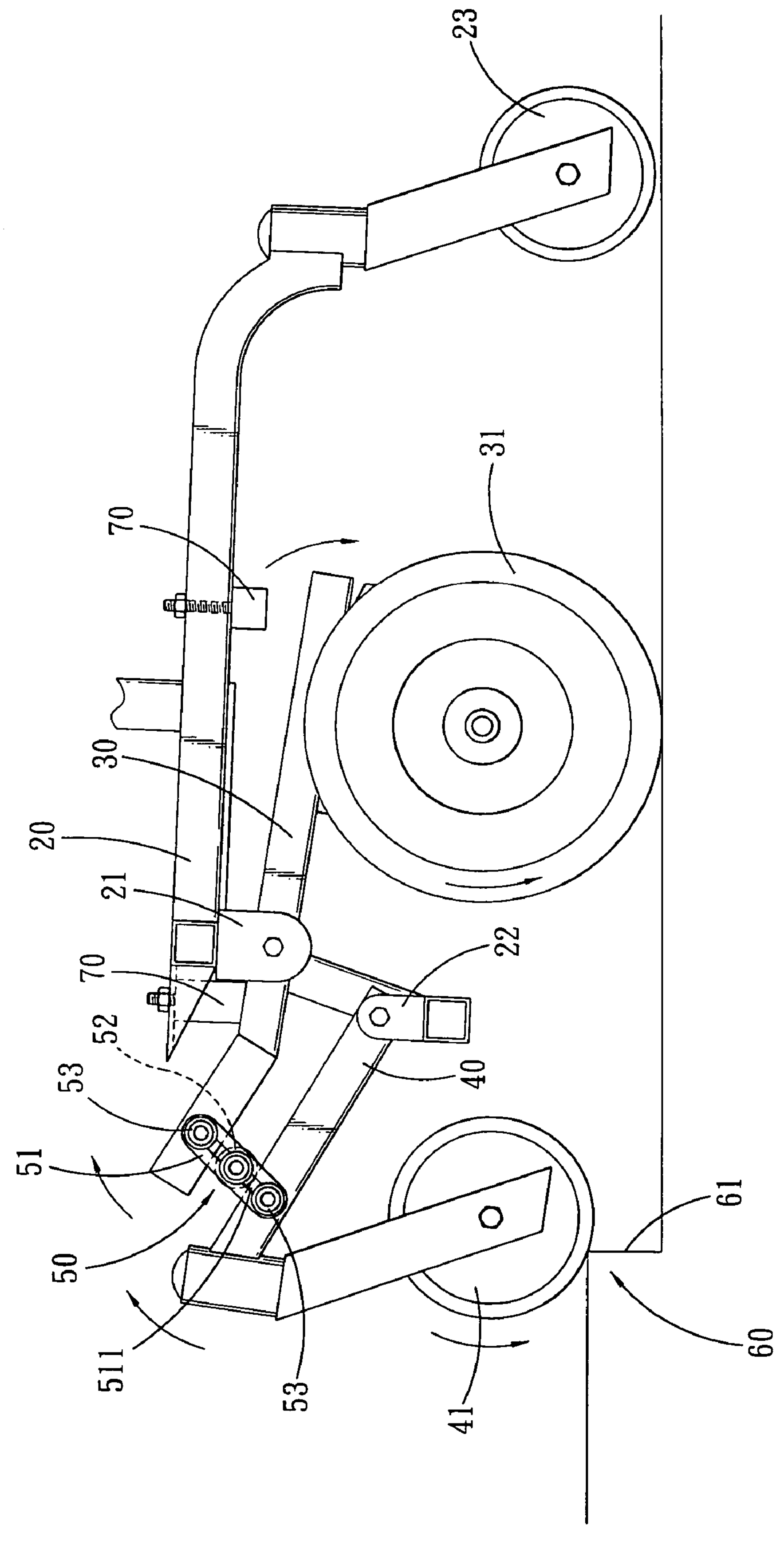
FIG. 6 is an operational view of the suspension structure for wheelchair in accordance with the present invention, wherein the front jockey wheel rolls on slopping surface of the barrier.

However, as shown in FIGS. 5 and 6, initially the front jockey wheel 41 will contact the sloping surface 61 of the barrier 60 upon encountering a barrier 60 and is stopped by the surface 61 (as shown FIG. 5). At this moment, the driving wheel 31 keeps driving the wheelchair to move forward, with the pushing force generated by the driving wheel 31, the front jockey wheel 41 and the front cantilever 40 will rise upward smoothly. And then, via the sliding assembly 50, the front cantilever 40 raises an end of the movable arm 30 connecting to the sliding assembly 50, whereas another end of the movable arm 30 connecting to the driving wheel 31 is lowered accordingly. In other words, with the first ear 21 serving as a fulcrum of the movable arm 30, an end of the connecting 30 rises and the other end of the same is lowered.

It will be noted that when the end of the movable arm 30 connecting to the driving wheel 31 is lowered, the friction of the driving wheel 31 on the road will be increased (the driving wheel will abut closely against the road), such that the driving wheel is able to drive the wheelchair efficiently to move it forward, by this way, the front jockey wheel 41 rises continuously and rolls over the sloping surface 61 of the barrier 60. In real operation, initially the front jockey wheel 41 rises a little smoothly and then followed by a quick rise, so as to roll over the barrier 60.

Figure 7:
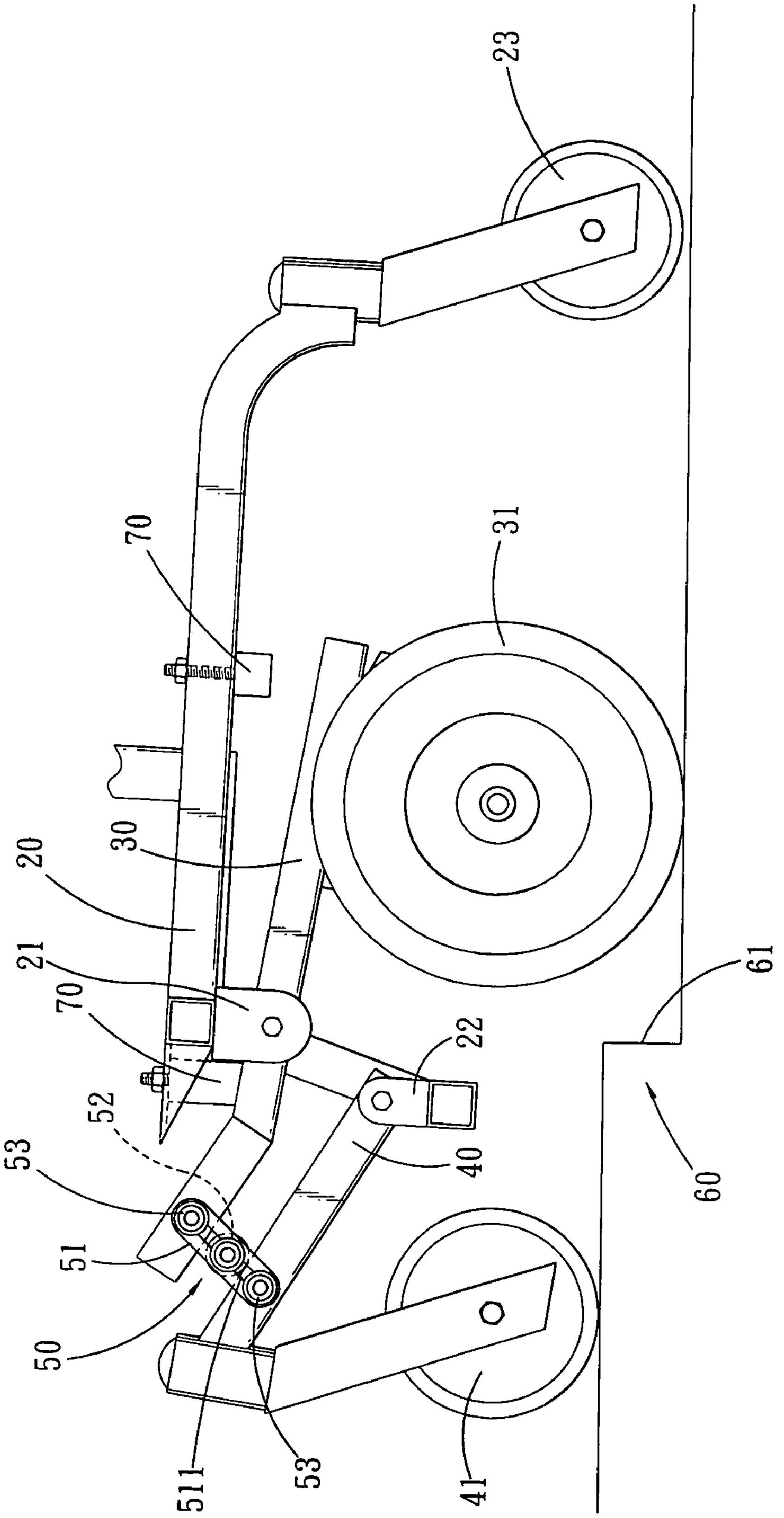
FIG. 7 is an operational view of the suspension structure for wheelchair in accordance with the present invention, wherein the front jockey wheel rolls over the barrier.
Figure 8:
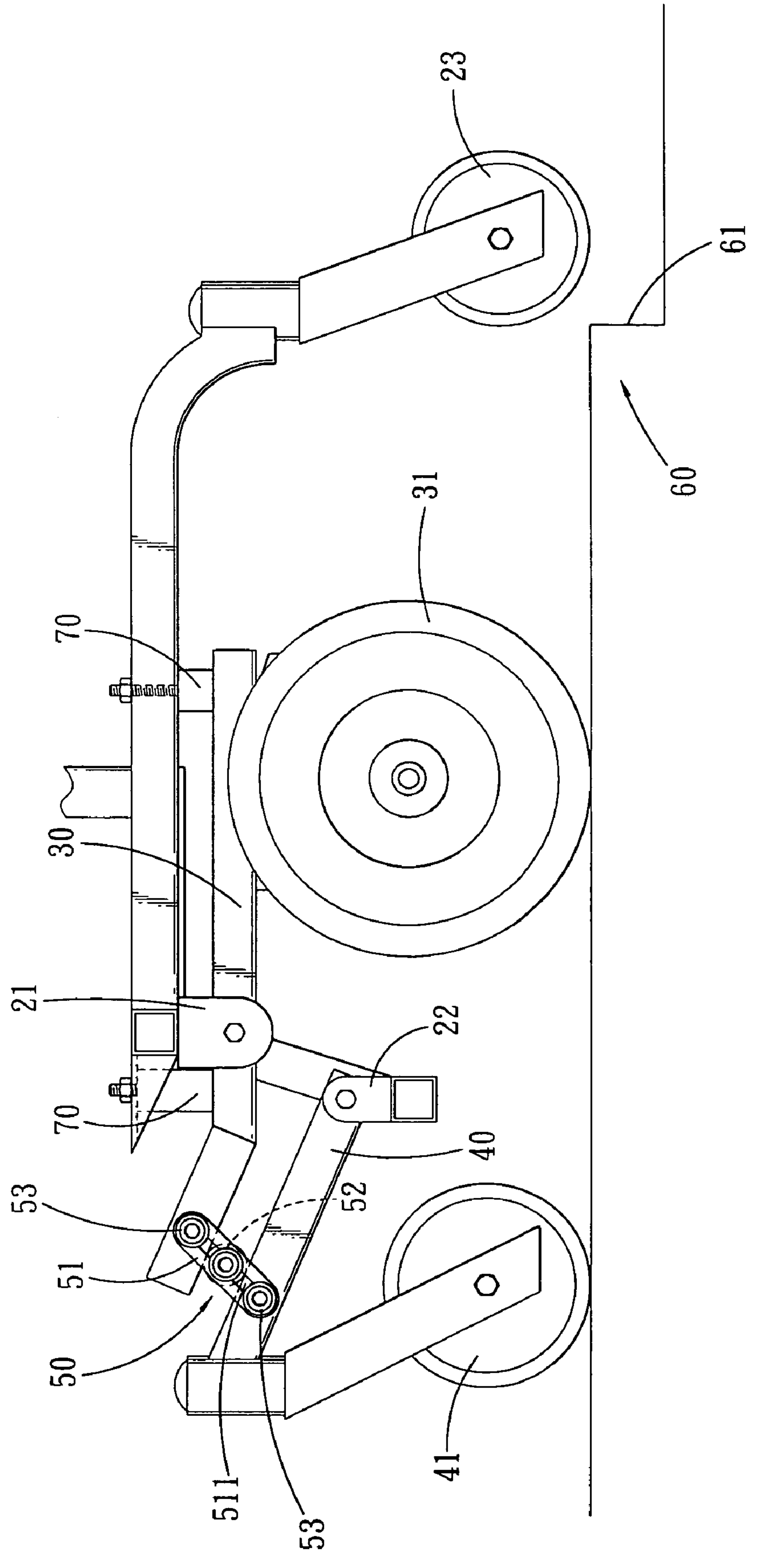
FIG. 8 is an operational view of the suspension structure for wheelchair in accordance with the present invention, wherein the front jockey wheel and the driving wheel rolled over the barrier.

After the front jockey wheel 41 overcome the sloping surface 61 of the barrier 60 (as shown in FIGS. 7 and 8), the height difference between the front jockey wheel 41 and the driving wheel 31 can be adjusted by slide movement of the movable arm 30 and the front cantilever 40 with respect to the sliding assembly 50. By this way, both the front jockey wheel 41 and the driving wheel 31 are allowed to keep contacting the road. Wherein the shaft 52 is able to make the movable arm 30 and the front cantilever 40 which located in the sliding plates 51 slide smoothly. After rolling over the barrier 60 and roll on level road again, the movable arm 30 and the front cantilever 40 will return to their original position with the help of the sliding assembly 50. In other words, with the sliding assembly 50 to couple the movable arm 30 with the front cantilever 40 and make them to slide, the suspension structure in accordance with the present invention is able to enable wheelchair to overcome the barrier.

Referring again to FIG. 3, between the movable arm 30 and the frame 20 can be provided with a buffer 70 which can be made of elastic rubber, the buffer 70 serves as a stop piece and a shock-absorber to smooth the swing of the movable arm 30, and make the ridding comfortable. The buffer 70 is useful but not essential.

The suspension structure of the present invention is simple but effective as only being comprised of movable arm 30, front cantilever 40 and sliding assembly 50, which requires no spring and steel rope, and no worry about elastic fatigue.

Figure 9:
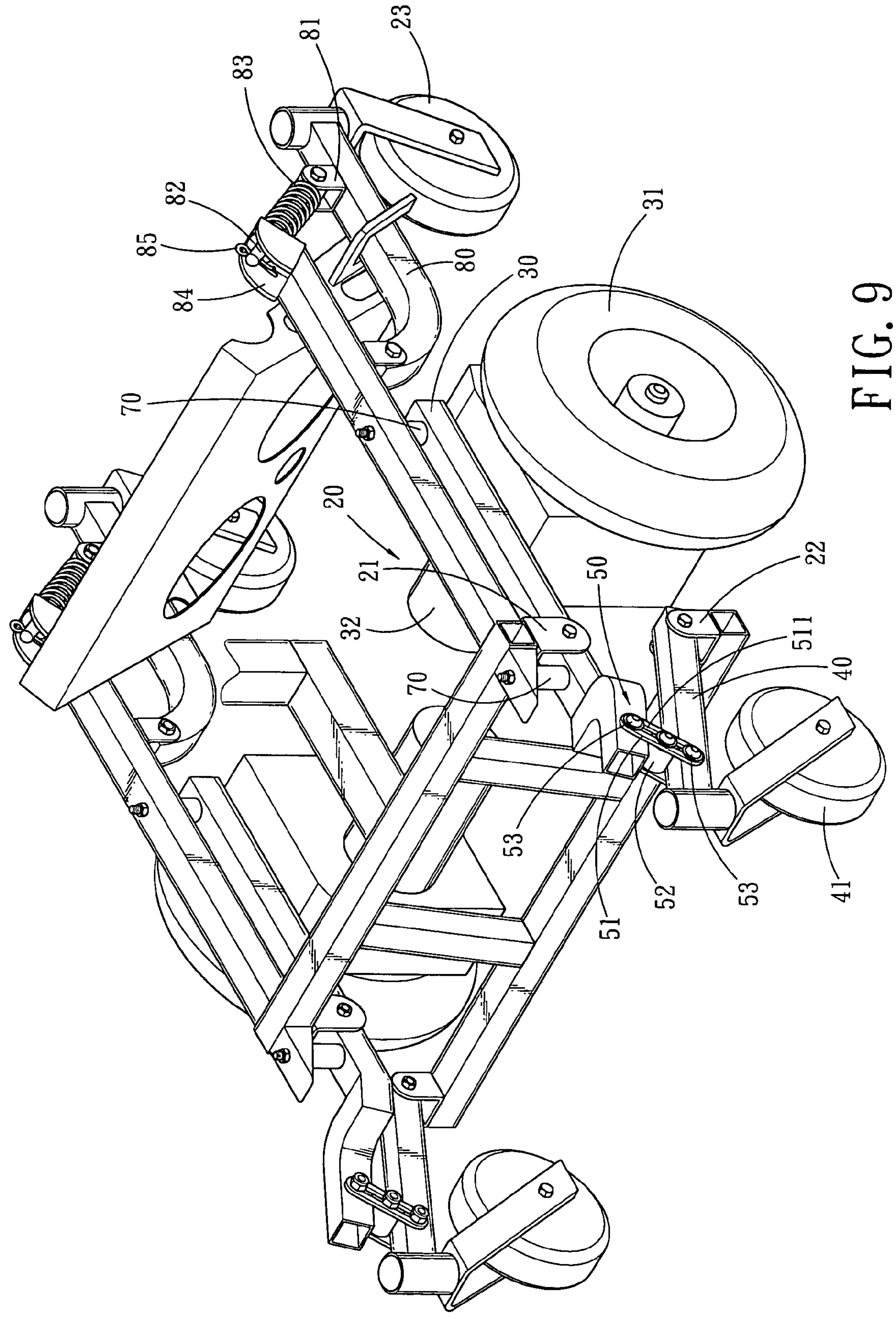
FIG. 9 is a perspective view of a suspension structure for wheelchair in accordance with another embodiment of the present invention.

In addition, the rear wheel of the wheelchair in accordance with the present invention is designed as having no suspension device, this design has no influence on the wheelchair in overcoming barrier, but it discomforts the rider. In view of this, the present invention offers a simple shock-absorbing method for reference. Referring to FIG. 9, wherein a cantilever 80 is provided on the rear side of the frame 20, and between the cantilever 80 and the rear side of the frame 20 a shock-absorbing spring is disposed for connecting them together. A first end of the cantilever 80 can be provided with rear wheel 23, whereas a second end of the same is pivotally connected to the rear side of the frame 20, such that the cantilever 80 is able to swing pivotally. An ear 81 can be provided on the rear side of the cantilever 80. The shock-absorbing spring comprises shaft 82 and spring 83, the spring 82 is mounted onto the shaft 83. An end of the cantilever 82 is connected to the ear 81 of the cantilever 80, and another end of the cantilever 82 is connected to mounting bracket 84 on the rear side of the frame 20, and then a locking pin 85 is used to prevent disengagement of the shaft 82 from the mounting bracket 84. By this way, the rear wheel 23 can be adjusted precisely corresponds to the real road condition.

While we have shown and described various embodiments in accordance with the present invention, it should be clear to those skilled in the art that further embodiments may be made without departing from the scope of the present invention.

What is claimed is:

1. A suspension structure for a wheelchair comprising a movable arm, a front cantilever, and a sliding assembly, the suspension structure being disposed between a frame, a driving wheel and a front jockey wheel of a wheelchair;

the frame serving as the main body of the wheelchair, wherein at a rear side of the frame is provided a rear wheel;

the movable arm is pivotally connected to the frame, and an end of the movable arm is connected to the driving wheel;

the front cantilever has a first end equipped with the front jockey wheel and has a second end connected to the frame; and the sliding assembly comprising a pair of slide plates and a shaft, wherein each of the slide plates is defined with a slot, and the slides plates are oppositely arranged and cooperate with a pair of bolts to pivotally connect the movable arm to the front cantilever, and the shaft is slidably disposed between the two bolts.

2. The suspension structure for a wheelchair as claimed in claim 1, wherein at least an ear is arranged at a front side of the frame for connecting the movable arm and the front cantilever.

3. The suspension structure for a wheelchair as claimed in claim 1, wherein at least a buffer is disposed between the movable arm and the frame for serving as a stop piece and shock-absorber to stop the movable arm and to limit travel of the movable arm.

4. The suspension structure for a wheelchair as claimed in claim 1, wherein a rear cantilever is arranged on the rear side of the frame of a wheelchair, a spring is disposed between the rear cantilever and the rear side of the frame for connecting them together, and an end of the rear cantilever is connected to the rear wheel.

* * * * *